W. GRUS, Jr.
ANTISKID DEVICE.
APPLICATION FILED JAN. 9, 1915.
1,164,279.
Patented Dec. 14, 1915.
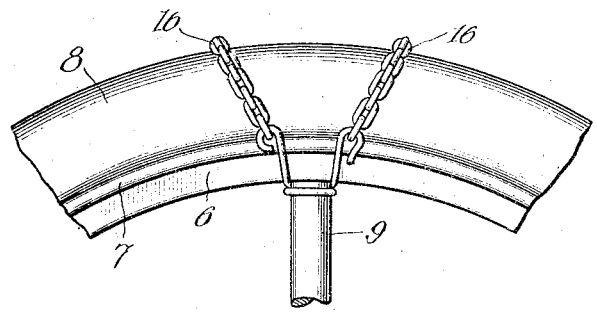
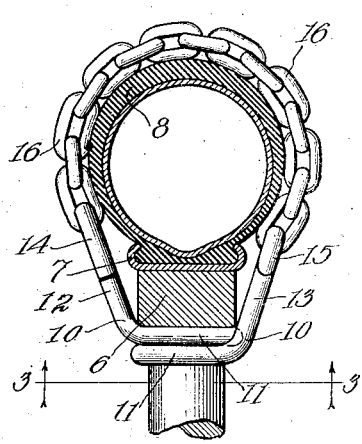
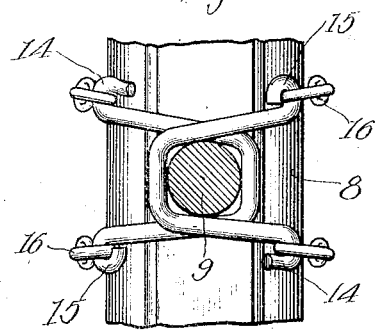
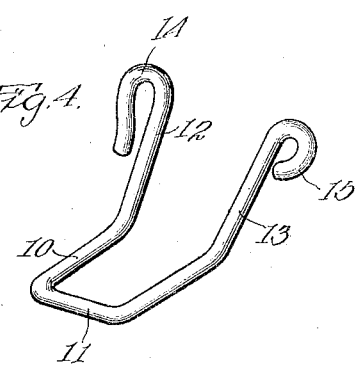
Witnesses:
Inventor.
William Grus Jr.
Brown Nissen & Sprinkle
Attys.

UNITED STATES PATENT OFFICE.

WILLIAM GRUS, JR., OF CHICAGO, ILLINOIS, ASSIGNOR TO GRUS LEAF SPRING OILER COMPANY, OF CHICAGO, ILLINOIS, A CORPORATION OF ILLINOIS.

ANTISKID DEVICE.

1,164,279.

Specification of Letters Patent.

Patented Dec. 14, 1915.

Application filed January 9, 1915. Serial No. 1,297.

*To all whom it may concern:*

Be it known that I, WILLIAM GRUS, Jr., a citizen of the United States, residing at Chicago, in the county of Cook and State of Illinois, have invented certain new and useful Improvements in Antiskid Devices, of which the following is a specification.

This invention relates to a device for overcoming or minimizing the tendency of a vehicle, particularly an automobile, to skid, and the principal object of the invention is to provide an improved and simple device of this class which is readily applied to the wheel without being wrapped entirely around, or encircling, the entire wheel.

A further object of the invention is to provide a simple device of this kind which can be applied in sections to one or more of the wheels so that any wheel can be given more tractive effect, as desired.

Other objects will appear hereinafter.

In the drawings, Figure 1 is a side elevation of a device constructed in accordance with the principles of this invention as applied to a portion of an automobile wheel; Fig. 2 is a sectional view of the same; Fig. 3 is a view taken on the line 3—3 of Fig. 2, and Fig. 4 is a perspective view of one of the stirrups.

Anti-skid devices for automobiles are objectionable for the reason that if they are used continuously the chains will wear at the tires, and most anti-skid devices are designed to be used continuously. There is seldom a necessity for the continuous use of an anti-skid device and the greatest necessity is for an emergency use, as for example, when the wheels are in a mud-hole or in soft ground where they do not have sufficient tractive effect. In such a situation it is impossible to apply most of the anti-skid chains and it is customary to wrap a rope or chain about that portion of the wheel which is above the mud-hole so that when the wheel slips around the wrapped chain or rope will engage in the soft ground and produce sufficient traction to enable the automobile to pull out of the hole. The present invention relates to a simple emergency device, which of course may be continuously used if desired, and which can be easily applied to any portion of a wheel since it requires only the space opposite one spoke of the wheel. Since every unit is complete in itself it is not necessary to completely encircle the tire opposite every spoke, and if more traction is desired it is necessary only to apply more of the devices until sufficient traction is obtained.

In the drawings a portion of an automobile wheel is shown comprising a felly 6, a rim 7 to which a tire 8 is secured, and a spoke 9.

The anti-skid device proper consists of a pair of U-shaped clips or stirrups 10, each formed with a rounded loop 11 with extremities 12 and 13 bent out of the plane of the rounded portion and formed one with a hook 14 and the other with an eye or closed loop 15. These stirrups are adapted to straddle a spoke 9 and are seated thereabout by inserting them from opposite sides of the wheel with the extremities 12 and 13 extending outwardly in the direction of the tire. A chain section 16 is connected at one end to the closed loop of each stirrup and is adapted to be connected to the hook of the opposite stirrup so that when the two stirrups are placed in position upon a single spoke they will be connected by two chain sections 16 extending over the tire of the wheel.

As many separate devices can be applied to each wheel as there are spokes, but it is found in practice that one or two of them is sufficient for most ordinary conditions in actual practice. As the devices are easily removable they will not ordinarily be continuously used and consequently an automobile tire will not be damaged to as great an extent as with anti-skid chains which extend all around the wheel.

What I claim is:

1. An automobile anti-skid device consisting of a pair of stirrups adapted to be seated from opposite sides of a wheel about the same spoke with the extremities of each stirrup projecting on the side opposite that from which it is seated, and chain sections connecting corresponding extremities of the opposite stirrups and extending over the tire of the wheel.

2. An anti-skid device for automobile wheels comprising a pair of stirrups adapted to be seated about a single spoke from opposite sides thereof each having looped extremities, one of which is in the form of a hook, and chain sections connecting the loop of one stirrup with the hook of the other stirrup around the wheel and detachable at one end therefrom.

3. An anti-skid device for wheels consisting of a pair of stirrups adapted to be seated upon a single spoke from opposite sides thereof, each stirrup having a closed loop at one end and a hook at the other, and chain sections adapted to be passed over the tire of the wheel, each section being connected at one end to the closed loop and adapted to be connected at the other end to the hook of the opposite stirrup.

4. An anti-skid device for automobile wheels consisting of a pair of U-shaped clips, the extremities of which are bent out of the plane of the rounded portion thereof so that they may be seated upon the same spoke from opposite sides thereof and lie flat against the wheel felly with the extremities extending in the direction of the tire, the extremities of each clip being formed with a closed loop in an open hook, and separate chain sections connected at one end to the closed loop and adapted to be looped over the hook of the opposite clip and over the tire to hold the clips in position and to provide chain sections along the outside of the tire.

In testimony whereof I have signed my name to this specification, in the presence of two subscribing witnesses, on this 6th day of January A. D. 1915.

WILLIAM GRUS, Jr.

Witnesses:
 Charles H. Seem,
 Kent W. Wonnell.